United States Patent [19]

Yuter

[11] Patent Number: 4,800,438

[45] Date of Patent: Jan. 24, 1989

[54] TELEPHONE CONSOLE FOR RESTAURANT TABLES

[76] Inventor: Seymour C. Yuter, 407 Cedar Dr. W., Briarcliff Manor, N.Y. 10510

[21] Appl. No.: 129,980

[22] Filed: Dec. 8, 1987

[51] Int. Cl.[4] .................. H04N 5/64; H04N 5/645; H04R 1/02; H04R 1/21

[52] U.S. Cl. .................... 358/254; 379/436; 379/419; 379/434; 379/441; 379/454; 379/376; 379/110; 379/90; 379/53; 381/188; 381/205; D26/52; D26/58

[58] Field of Search ............... 358/254; 379/33, 172, 379/100, 101, 436, 438, 419, 428, 434, 440, 441, 454, 376, 110, 90, 53; 381/188, 205; D26/52, 58, 54

[56] References Cited

U.S. PATENT DOCUMENTS

| | | | |
|---|---|---|---|
| D. 138,474 | 8/1944 | Merrill | 14/54 |
| D. 195,408 | 6/1963 | Prescott | D14/54 |
| D. 208,634 | 9/1967 | Janda | D14/54 |
| D. 275,196 | 8/1984 | Huang | D14/54 |
| D. 296,891 | 7/1988 | Taniuchi | D14/54 |
| D. 296,893 | 7/1988 | Taniuchi | D14/54 |
| 2,924,661 | 2/1960 | Messeas | 381/188 |
| 4,046,972 | 9/1977 | Huizinga | 379/164 |
| 4,074,793 | 2/1978 | Yuter | 379/33 |
| 4,232,196 | 11/1980 | Filippi | 358/108 |
| 4,485,400 | 11/1985 | Lemelson | D14/54 |
| 4,518,821 | 5/1985 | Yuter | 379/172 |
| 4,577,068 | 3/1986 | Kelly | 379/428 |
| 4,663,670 | 5/1987 | Ito | 358/254 |
| 4,694,486 | 9/1987 | Yuter | 379/436 |
| 4,720,849 | 1/1988 | Tayama | 379/80 |

OTHER PUBLICATIONS

Luma: Visual Telephone, *Telephony*, p. 19, Dec. 1986.

*Primary Examiner*—James J. Groody
*Assistant Examiner*—Jerome Grant, II
*Attorney, Agent, or Firm*—S. C. Yuter

[57] ABSTRACT

A restaurant telephone console comprising a U-shaped chassis mounted upwards on a pipe above a table and supporting a speaker, lamp bulbs, telephone chime and TV set over which fits a translucent circular lampshade support on which is mounted a telephone, audio and lamp controls and a push-button switch for selecting audio and video signals. Food and drink orders may be taken over the telephone. The audio and video signals include music, daily specials and major TV events. An alarm is activated if the lampshade support is pulled from the chassis. The speaker is mounted cone down on the chassis and the audio is emitted from the chassis' open ends. When the telephone is rung, the chime activates and the lamp bulbs go out. The area of the lampshade support in front of the TV screen is transparent and may comprise a magnifying lens. The console is rotatable to face the phone and TV screen toward a patron at the table.

54 Claims, 5 Drawing Sheets

TELEPHONE CONSOLE FOR RESTAURANT TABLES

BACKGROUND OF THE INVENTION

1. Field of the Invention

This invention pertains to restaurants and cocktail lounges and more particularly to a console which includes both a lamp and telephone for use at tables in restaurants and cocktail lounges.

2. Description of the Related Art

U.S. Pat. No. 4,074,793 issued to the present inventor on Feb. 21, 1978 for a Restaurant Dining System ("793 Patent"). It discloses a restaurant dining system comprising dining and bar areas, a cocktail lounge, a kitchen and a raised order-taking post separate from the dining and bar areas. The order-taking post facilitates the prompt delivery of food and drink orders taken by telephone from patrons in the dining area and cocktail lounge in visual communication with the order-taking person. That patent in FIG. 5 discloses a table on which a telephone is positioned with a speaker mounted beneath the table top. The patrons use the telephone to communicate their orders to persons in the order-taking post. The speaker permits music to be played at the table. The same disclosure is in U.S. Pat. No. 4,306,388 issued to the present inventor on Dec. 22, 1981 for a Restaurant Entertainment System, particularly for a combined piano bar-bandstand which straddles the bar area and dance floor.

U.S. Pat. No. 4,518,821 issued to the present inventor on May 21, 1985 for a Restaurant Telephone Entertainment System ("821 Patent"). It discloses a combined telephone-speaker-lamp console for use on tables in a restaurant having a telephone ordering system of the type disclosed in the 793 Patent. A telephone switch board permits the feeding of a telephone conversation into the audio amplifier which drives the console speakers so that a conversation on other telephones can be played on the speakers. The lamp blinks in response to the telephone ringing current fed to the associated telephone. Each console has a cable of sufficient length to extend via a hole in the table supporting the console through a pedestal and past the pedestal's base to be plugged into the central cable system and then retracted beneath the base. The same disclosure including the retraction feature is disclosed in U.S. Pat. No. 4,694,486 issued to the present inventor on Sept. 15, 1987 for a Combined Telephone-Table System. Both patents disclose in FIGS. 1–3 a combined telephone-lamp-speaker console in which the speaker is enclosed in or beneath a lantern lamp, the telephone is mounted adjacent the lantern lamp and the console is supported directly on the table.

A Combined Lamp and Telephone Stand is disclosed in U.S. Pat. No. Des. 180,105 issued on Apr. 16, 1957. A conventional table lamp has a frame extension which rests on the table and is adapted to support a telephone. A telephone and lamp are shown together on the top of a table in U.S. Pat. No. 2,960,576 issued Nov. 15, 1960 for a Signal-Controlled Actuator for Telephones and the Like. U.S. Pat. No. 1,841,618 issued Jan. 19, 1932 discloses a floor lamp which includes a speaker, as does U.S. Pat. No. 2,559,045 which issued July 3, 1951 for a Combined Lighting Device and Radio Receiver Or Loud Speaker. A Patio Light and Speaker Combination is disclosed in U.S. Pat. No. 3,194,952. A floor lamp with a telephone which extends over a table is shown in U.S. Pat. No. 1,765,699. None of these devices is of practical use for the Restaurant Dining System disclosed in the present inventor's 793 Patent.

The combined telephone-lamp-speaker lantern console disclosed in the present inventor's 821 Patent has a large base and thus occupies a relatively large portion of the table on which it stands, especially on tables for two persons. That can leave insufficient room for plates. Moreover, if the lantern were mounted on a post off the table its height would block a person's view of another person across the table. Further, most of the components of the 821 Patent console are readily subject to vandalism and theft. And it does not include a color television display.

BRIEF SUMMARY OF THE INVENTION

A specific object of the invention is to provide a combined telephone-lamp-speaker console which occupies a minimum amount of a table surface and does not block the view across the table.

A more general object of the invention is to provide an improved telephone-lamp-speaker console.

Another object of the invention is to provide a restaurant telephone console in which most of the components are resistant to vandalism and theft.

A further object of the invention is to provide a compact restaurant telephone console which includes a color television display.

Still another object of the invention is to provide a relatively inexpensive combined telephone-lamp-speaker-TV console.

Briefly, in accordance with the invention, a restaurant telephone console is provided comprising a chassis mounted on a pipe support extending above a table. A lampshade support has a downwardly-extending vertical side wall which goes over the chassis. A telephone is mounted on the top panel of the circular lampshade support. Other components -- including a speaker, lamp bulbs, a chime and a pocket color TV set -- are mounted on the chassis beneath the lampshade support. The lamp bulbs, when lighted, illuminate a portion of the table around the console.

A principal feature of the invention is that the lampshade is circular and the chassis is U-shaped and rectangular with its diagonal corner distance substantially equal to the inside diameter of the downwardly-extending vertical side wall, so that when the lampshade goes over the chassis, it slidingly engages the corners of the chassis to hold the lampshade in place.

A feature of the invention is the illumination of the back side of the liquid crystal display screen of the pocket color TV set to obtain a picture from the normally illuminated side of the screen.

Another feature of the invention is that the circular lampshade support is translucent with its top panel colored, and the illumination means for the liquid crystal display screen also illuminates the top panel so that each restaurant telephone console can be distinguished from others by its color for the purpose of expeditiously delivering food and drinks to the tables.

Still another feature of the invention is that the TV display portion of the circular lampshade can be a magnifier to magnify the pocket color TV picture.

Another feature of the invention is an alarm system which is activated if the circular lampshade support is lifted from the chassis.

Still another feature of the invention is the use of side openings of the U-shaped rectangular chassis rather than an opening in the chassis adjacent the cone of the speaker to help project the speaker sound. That prevents the speaker cone from being damaged from beneath the chassis.

Yet another feature of the invention is the use of the ringing current on the telephone line to activate a pleasantly-sounding chime and at the same time turn off the lamp bulbs so that persons using the table are visually reassured that their phone rather than an adjacent phone is ringing.

A further feature of the invention is a multiple push-button switch and audio-video system for selecting any of the following to listen to and in some cases see: background and dance music; an audio announcement and video display of the food and drink specials of the day; an in-house talk show or other entertainment, and the audio and video display of major TV events of interest to patrons.

An advantage of the invention is that the telephone console may be rotated on its pipe support so that the telephone and TV display can face different persons at the table.

BRIEF DESCRIPTION OF THE DRAWINGS

Other objects, features and advantages of the invention will be apparent from the following Description of the Preferred Embodiment taken together with the accompanying drawings in which.

DESCRIPTION OF THE PREFERRED EMBODIMENT

Figure 1:
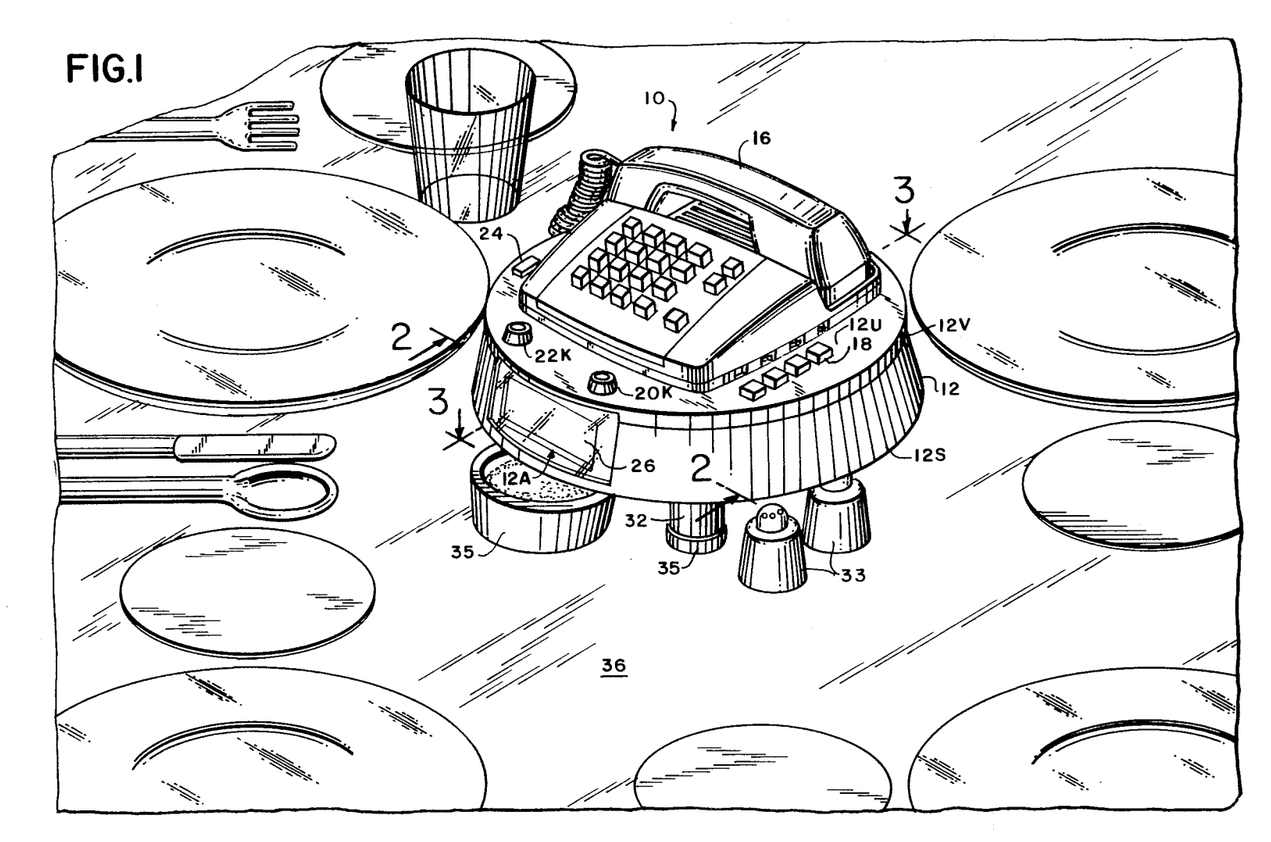
FIG. 1 is a perspective view of a restaurant telephone console mounted on a pipe support above a table in accordance with the preferred embodiment of the invention and especially showing the telephone, circular lampshade, multiple push-button switch, audio and lamp controls and TV display.
Figure 2:
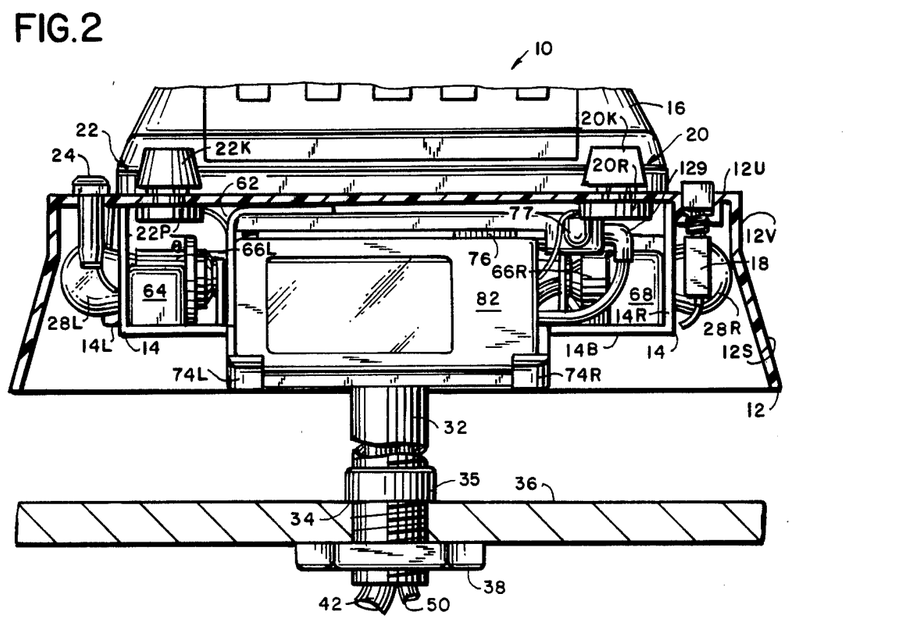
FIG. 2 is a cross-sectional front elevational view of the restaurant telephone console taken along the lines 2—2 of FIG. 1 showing how the console is mounted on the U-shaped rectangular chassis above the table, and also showing the lamps, pocket TV display and other components.
Figure 3:
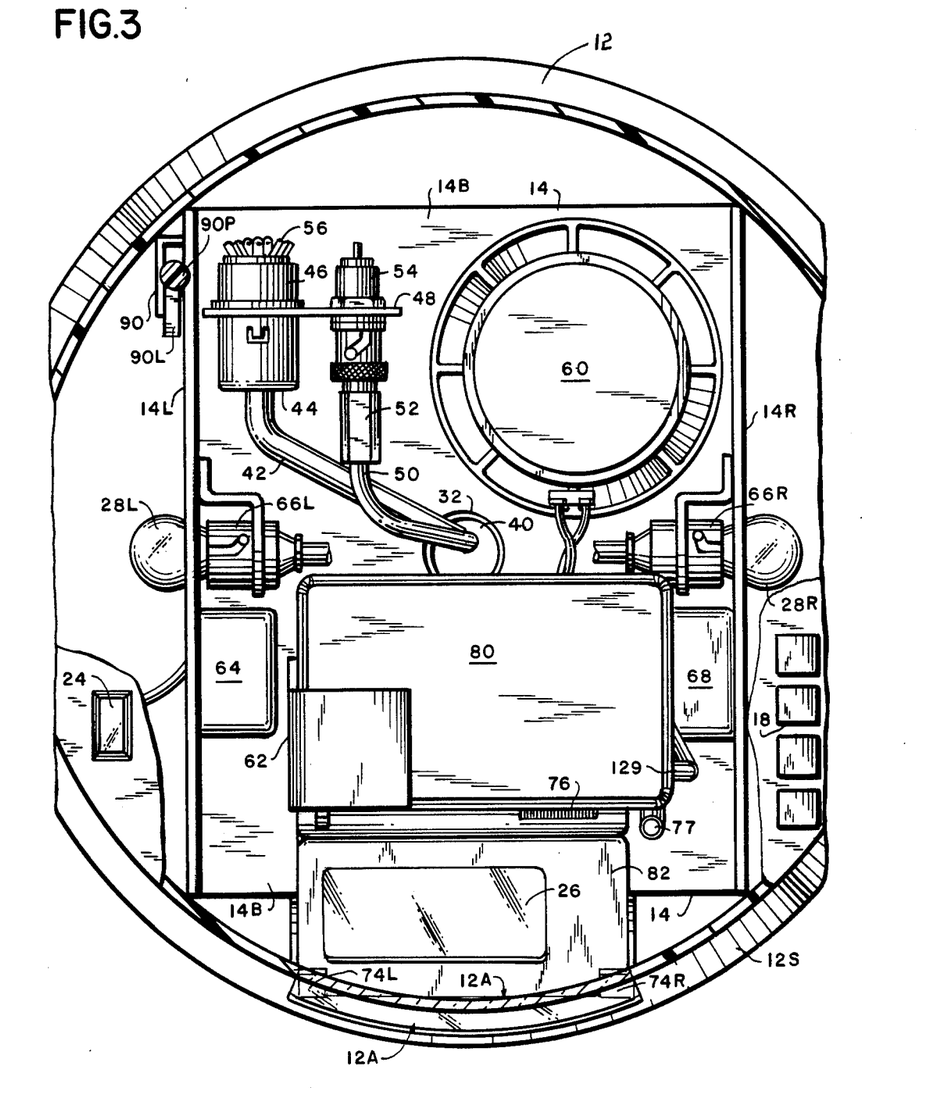
FIG. 3 is a top plan view of the U-shaped rectangular chassis taken along the lines 3—3 of FIG. 1 showing how the inside of the circular lamp support engages the corners of the chassis, and also how the speaker, lamps, chime, pocket color TV and other components are mounted, excluding some of the wiring, and partly unbroken to show the multiple push-button switch (on the right) for selecting audio and video displays and a neon ringing indicator (on the left).
Figure 4:
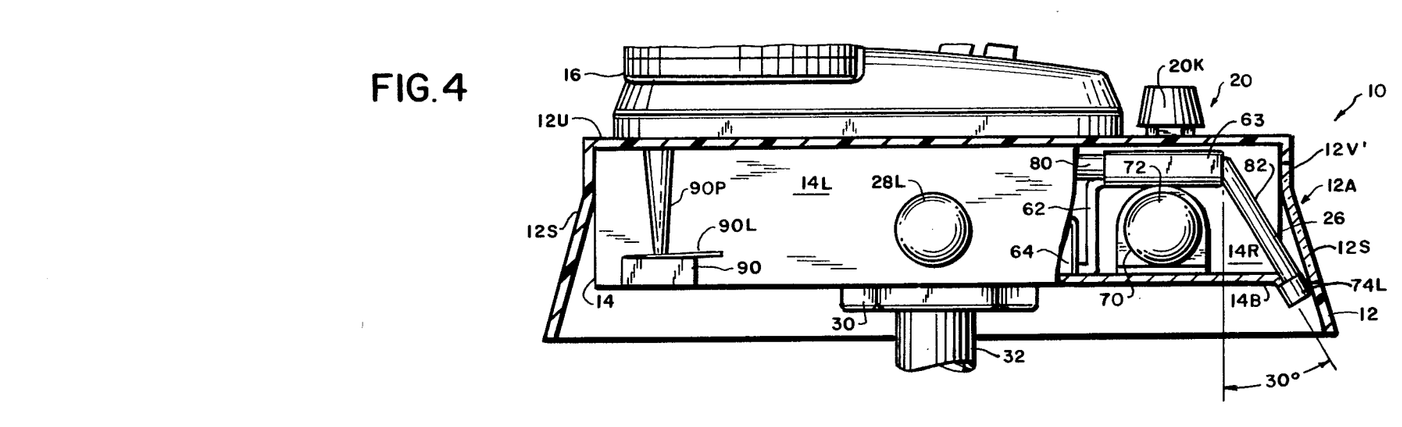
FIG. 4 is a cross-sectional side elevational view partly broken away of the restaurant telephone console showing how the circular lampshade's vertical side wall engages the upper corners of the U-shaped rectangular chassis, how the liquid crystal display screen of the pocket TV set is mounted and illuminated to provide a good display to a person sitting at the table, and also (at the left) the alarm lever switch for signaling an alarm when the circular lampshade support is removed without authorization.

Referring to FIGS. 1, 2 and 4 of the drawings, a restaurant telephone console 10 is shown comprising a circular lampshade support 12 which slides over a U-shaped rectangular chassis 14 (FIGS. 2 and 4). Lampshade support 12 is made from a clear plastic and has an upper panel 12U and an outwardly flared sidewall 12S with an upper vertical section 12V. Chassis 14 is made from aluminum sheet and has a bottom panel 14B (FIG. 2), a left side wall 14L, a right side wall 14R and is open at the top and remaining sides. The inside diameter of lampshade support 12 at the upper vertical section 12V is substantially equal to the diagonal distance between the corners of chassis 14 so that lampshade support 12 can be lowered over chassis 14 with the inside of vertical section 12V slidingly engaging each of the four upper corners of chassis 14 (FIG. 3) to releasably connect lampshade support 12 to chassis 14.

A telephone 16 (FIGS. 1 and 2) is screw mounted to the top of upper panel 12U of lampshade support 12. Also mounted on lampshade support 12 is push-button switch 18, lamp rheostat 20, audio volume control 22 and neon ringing indicator 24. Lamp rheostat 20 (FIG. 2) consists of a lamp control knob 20K and a rheostat 20R having a shaft which passes through a hole in, and is concentric-nut mounted on, the upper panel 12U and inserted into knob 20K. Volume control 22 consists of a control knob 22K and a mono L-pad control 22P having a shaft which passes through a hole in and is concentric-nut mounted on upper panel 12U and is connected to knob 22K. Push-button switch 18 (FIG. 1) has four separate switch-operating buttons, as will hereinafter be explained in greater detail. Neon ringing indicator 24 is connected directly across the telephone line and flickers in synchronism with the telephone ringing current when the console 10's telephone 16 is called.

The bottom side of the upper panel 12U (FIG. 1) of lampshade support 12 is spray painted with a colored paint to the point where the clear plastic becomes translucent. The inside of side wall 12S is spray painted with a white paint to the point where it becomes milky white translucent. However, a rectangular TV display area 12A of lampshade support 12 in front of a TV screen 26 is left clear. Lamp 28R (FIG. 2) extends from side wall 14R of chassis 14 and lamp 28L extends from side wall 14L. Lamps 28 illuminate the area around console 10, by direct illumination downward and via the translucent side wall 12S of lampshade support 12.

Figure 5:
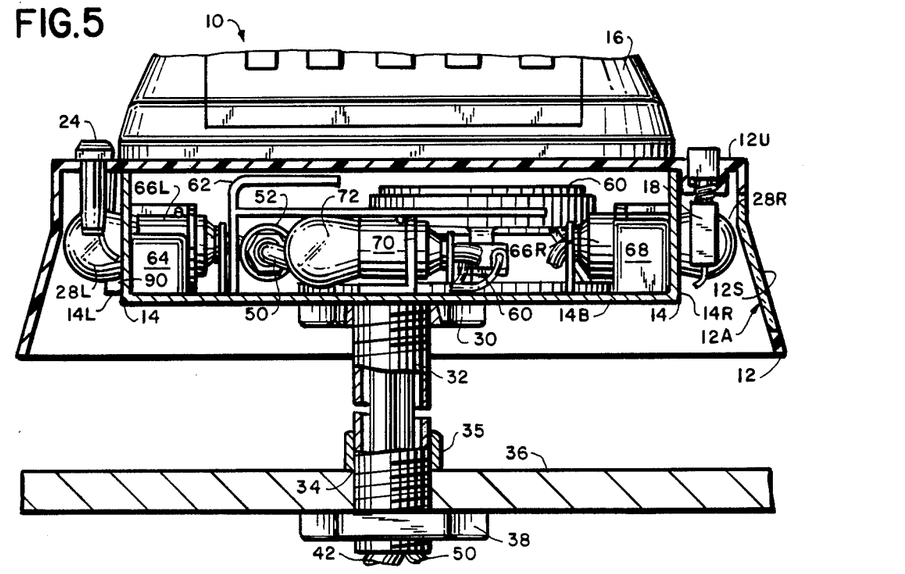
FIG. 5 (beneath FIG. 2) is a cross-sectional front elevational view of the restaurant telephone console taken just behind the lines 2—2 of FIG. 1 further showing the illumination lamp of the liquid crystal display screen.

The bottom panel 14B (FIG. 3) of chassis 14 has a central opening 40 for the passage of cables 42 and 50 into console 10. Bolted to the underside of bottom panel 14B (FIG. 5) beneath and encircling opening 40 is a pipe support fixture 30 which is screw connected to one end of pipe 32. Pipe 32 passes through a hole 34 in table 36 via a nut 35, with its other end screw connected to another pipe support fixture 38. Pipe 32 is shown broken apart for the sake of convenience. However its height above the top surface of the table is about five inches. That is, console 10 is supported about five inches over the table, leaving room beneath it for salt and pepper shakers 33 (FIG. 1) and a sugar container 35. Console 10 may be rotated around the end of pipe 32 to face the telephone 16 and TV screen 26 toward different persons seated around the table 36. A stop (not shown) prevents the console 10 from being rotated more than 360°.

The inside of U-shaped rectangular chassis 14 and the components mounted on chassis 14 are shown in FIG. 3.

The bottom panel 14B of chassis 14 has its central opening 40 concentric with the opening in pipe 32. The multi-pair cable 42 passes through opening 40 and terminates in plug 44, which is plugged into socket 46 mounted on bracket 48. Coaxial cable 50 also passes through opening 40 and terminates in a male coax connector 52 which plugs into a female coax connector 54, also mounted on bracket 48. Coax connectors 52 and 54 are of the BNC type. Lugs 56 of socket 46 function as a terminal board for the wires (not shown) connected to the components mounted on chassis 14. Other lugs 56 are connected via snap connectors (not shown) to the telephone 16 (FIG. 2), push-button switch 18, rheostat 20, volume control 22 and neon ringing indicator 24 mounted on the upper panel 12U of circular lampshade 12.

Also mounted on bottom panel 14B (FIG. 3) of chassis 14 are the speaker 60, pocket TV bracket 62, chime 64, lamp socket 66L, lamp socket 66R, TV filters 68 and TV screen illumination socket 70 (FIG. 4) with its illuminating lamp 72. Pocket TV 80 (FIGS. 3 and 4) snaps into TV bracket 62, and its TV screen panel 82 slides into slot extensions 74L and 74R of chassis 14. Pocket TV 80 is connected to TV screen panel 82 via an 18-wire ribbon connector 76 (FIG. 3). Lamp 28R plugs into socket 66R and lamp 28L plugs into socket 66L through respective openings in side walls 14R and 14L of chassis 14.

Pocket TV 80 is a CASIO TV-300 Pocket Color LCD Television manufactured by Casio Computer Co., Ltd. of Japan. It receives VHF frequencies channel 2–channel 13 and UHF frequencies channel 14–channel 69. Its display element is a high resolution color liquid crystal display (twisted nematic type). It drive system is a high quality matrix. The screen size is 2.0 square inches and the screen system is a solar projection screen system. It requires a 3 VDC power supply and consumes approximately 0.6 watt. It has volume, brightness and tint controls plus a function selector. The function selector is a three-position slide switch: power off; VHF band (channels 2–13); UHF band (channels 14–69). In normal operation the screen of the CASIO TV-300 is illuminated from its outside by natural or artificial light and a picture is consequently displayed on a mirror mounted on the TV body, with the screen panel hinge-connected to the TV body at about a 30 degree angle. The CASIO TV-300 features automatic tuning; that is, when one of two channel-selection switches is depressed its circuitry seeks a received TV channel signal in a higher or lower frequency direction depending on which switch is depressed. Its antenna is a concentric sleeve rod antenna which can be lengthened by pulling a knob at its top. The antenna bottom is rotatably connected to an antenna post.

A hinge rod connecting the body of CASIO TV-300 (pocket TV 80, FIG. 3) to its screen panel (TV screen panel 82) is removed. Also removed is its rod antenna leaving its antenna post 77. As shown in FIGS. 3 and 4, pocket TV 80 snaps into a U-shaped portion 63 of TV bracket 62 connected to bottom panel 14B of chassis 14. TV screen panel 82 slides into slot extensions 74L and 74R which extend from bottom panel 14B at a 120 degree angle. Screen illumination socket 70 (FIGS. 4 and 5) is connected to bottom panel 14B beneath TV bracket 62 so that its lamp 72 illuminates the backside of the screen of TV screen panel 82. With a 13.6-volt 0.59 amps auto lamp 72, there is sufficient illumination on the backside of the screen of TV screen panel 72 so that a tuned-in TV picture can be seen from the outside of TV screen panel 82 by a person looking through the clear TV viewing area 12A (FIGS. 1 and 4) of lampshade support 12. In operation as part of console 10, the function selector of pocket TV 80 is permanently switched to the UHF band and pocket TV 80 is turned on by switching +3VDC to it via plug 129 (FIG. 3).

Figure 7:
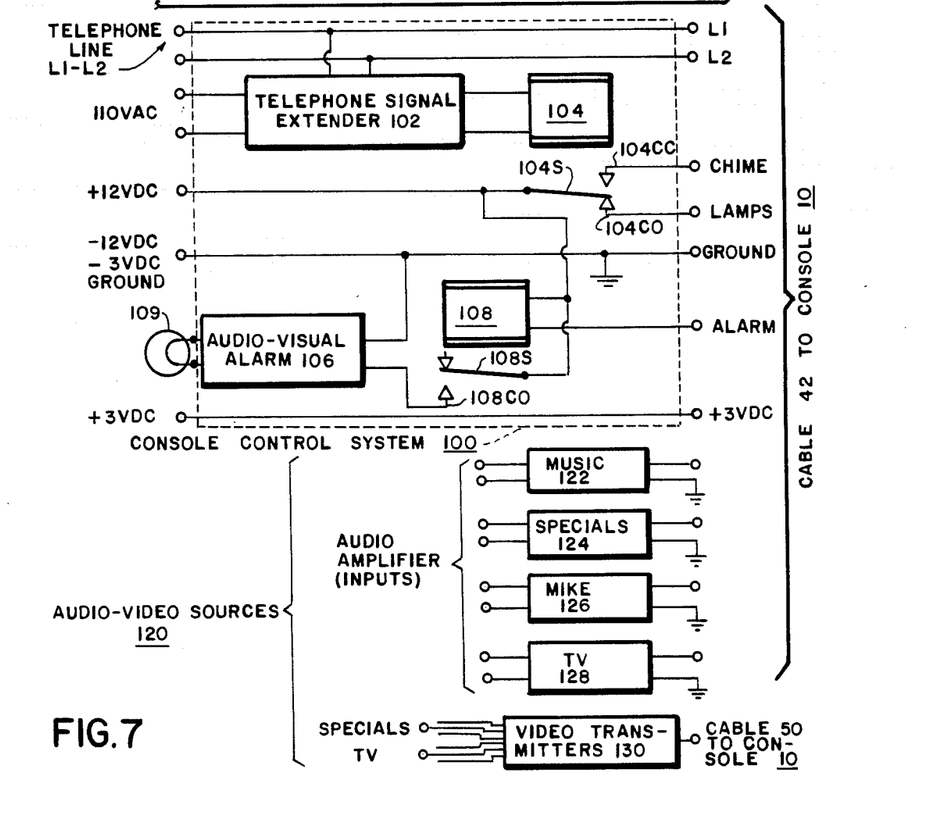
FIG. 7 is a schematic electrical diagram of the console control system and associated audio and video components used to operate the restaurant telephone console and the alarm system.

A console control system 100 for controlling a single console 10 is shown in FIG. 7. It includes a telephone line L1-L2, telephone signal extender 102, chime relay 104, audio-visual alarm 106, alarm relay 108, a +12 volt direct current source +12VDC, a +3 volt direct current source +3VDC and a 110 alternating current source 110VAC. The negatives of the 12 and 3 VDC sources are connected together and grounded.

Telephone signal extender 102 is responsive to telephone ringing current on telephone line L1-L2 to connect the 110VAC to chime relay 104 during the presence of the ringing current. When activated, chime relay 104 switches +12VDC connected to its movable contact 104S from the normally open contract 104CO, connected to the console lamps 28L and 28R (also see FIG. 3), to closed contact 104CC, connected to the console chime 64. Thus, when the telephone 16 (FIG. 2) is ringing, lamps 28L and 28R (FIG. 3) go out and the chime 64 chimes. The darkening of a console 10's lamps 28L and 28R visually assures a patron at the table that his or her telephone is ringing. Otherwise, chime tones at adjacent tables, though different, might lead a patron to mistakenly believe that his or her telephone is chiming. That visual assurance is reinforced by the simultaneously flashing neon ringing indicator 24 connected across telephone line L1-L2.

The +12VDC switched to console chime 64 could also be used to operate a relay which disconnects the moving contact 22C (FIG. 8) of volume control 22 to speaker 60 so that no audio is played during the presence of the telephone ringing current, further assuring the patron that his or her phone is being called.

Telephone 16 (FIG. 1) is a Panasonic Easa-Phone Model KX-T2341 made by Matsushita Electric Industrial Co., Ltd. of Osaka, Japan. To the left of the regular 12 tone buttons are buttons for mute, pause, flash and redial. To the right are buttons for hold, auto and speakerphone. Along its near side are a memory switch, ringer volume selector (but the telephone ringer is disabled), dialing mode selector and volume control. Telephone 16 is used by either lifting the handset or activating the speakerphone. The speaker is shown beneath the handset. The auto button is used for automatic speed dialing for up to 12 30-digit telephone numbers. Thus, automatic dialing inside the restaurant to the order-taking post, manager, assistant manager, cashier, kitchen, bar and other numbers can readily be programmed.

Telephone signal extender 102 (FIG. 7) is made by AMF/Potter and Brumfield, Princeton, Ind. under the RingAlert trademark, Model CZS-06-71000.

Chime 64 (FIG. 3) is a Datsun 280Z door-operated 12 volt chime, which produces a pleasant two tone sound. Other automobile-type chimes with distinctly different tones are used at adjacent tables.

Also shown in FIG. 7 is audio-video sources 120 which is common to all consoles 10 in a restaurant. It includes music audio amplifier 122, specials audio amplifier 124, microphone (talk show) audio amplifier 126, TV (events) audio amplifier 128 and video transmitters 130. The input to music audio amplifier 122 is a magnetic tape, magnetic cassette, record or compact disc player, all switchable by a disc jockey to a microphone to announce what music is being played. Entertainers may also use the microphone. The input to specials audio amplifier 124 is a magnetic cassette player on which the food and drink specials of the day are repeatedly recorded. The input to microphone audio amplifier 126 is a microphone used for talk shows. The input to TV audio amplifier 128 is the audio output of a standard TV receiver on which major sports and other events are tuned. One output of each audio amplifier is fed via a separate wire of cable 42 to console 10. The other output of each audio amplifier is grounded and connected to the common ground wire of cable 42.

Cable 42 is a multi-wired flat cable, including heavy duty or multiple conductors for the +12VDC used to light the lamps 28 of console 10. Cable 42 is connected to console 10 via a plug and socket (not shown) at the pedestal base of the table 36 (FIG. 2). Cable 42, which is round on the table 36 side of the base socket, passes through the pedestal of the table and opening 40 (FIG. 3) and terminates in plug 44 which plugs into socket 46. Each wire of cable 42 is connected to a separate lug 56 of socket 46. The connections from lugs 56 to the components of console 10 are not shown for the sake of clarity.

Referring to FIGS. 2, 3 and 7, the wires of cable 42 are connected via lugs 56 of socket 46 as follows: The common −12VDC, −3VDC and ground wire is connected directly to chassis 14. The +12VDC lamps wire is connected to each of the lamp sockets 66R and 66L via rheostat 20 and also directly to socket 70 (also see FIG. 5). Sockets 66R, 66L and 70 are mounted on chassis 14 and thus grounded. Rotation of knob 20K (FIG. 2) varies the intensity of illumination of lamps 28 from bright to dim. The chime wire is connected to chime 64 whose other terminal is grounded to chassis 14. The telephone line wires L1 and L2 are connected via a module plug to the input jack (not shown) of telephone 16 and across neon ringing indicator 24. The alarm wire is connected to alarm switch 90 (FIG. 4) whose other terminal is grounded to chassis 14.

Alarm switch 90 is a lever operated subminiature single pole double throw lever microswitch. Its lever 90L is kept in the down or closed position by lever post 90P when lampshade 12 is fully positioned down over U-shaped rectangular chassis 14. Lever post 90P is screw connected to the underside of the upper panel 12U of circular lampshade 12. If circular lampshade 12 is lifted just a little bit, lever 90L lifts, switching alarm switch 90 to its normally-open position ungrounding switch 90 from the chassis 14. That ungrounds the alarm terminal (FIG. 7) of alarm relay 108 opening a circuit from +12VDC through the alarm relay 108 to ground, causing alarm relay 108 to release. When alarm relay 108 releases, its movable contact 108S returns to its normally open position and contacts fixed contact 108CO. Movable contact 108S is connected to +12VDC so when it contacts contacts 108CO it activates audio-visual alarm 106 by connecting +12VDC to it since the other input terminal of audio-visual alarm 106 is grounded. The +12VDC in turn lights the alarm lamp 109 for that particular console 10.

Alarm lamp 109 is mounted on a centrally-located board together with an alarm lamp for each of the other consoles 10 in the restaurant. At the same time that audio-visual alarm 106 is activated an audio buzzer common to all of the consoles 10 is sounded at the central location by the +12VDC connected to audio-visual alarm 106. So both a visual and an audio alarm goes off at the central location if a circular lampshade 12 of a table console 10 is lifted by a patron, the lamp 109 identifying which console was lifted. In that way any attempted theft or vandalism of the internal parts of a console 10 are detected. The audio-visual alarm 106 of a console 10 can be deactivated when authorized personnel are working on it or before it is connected to cable 42.

Figure 8:
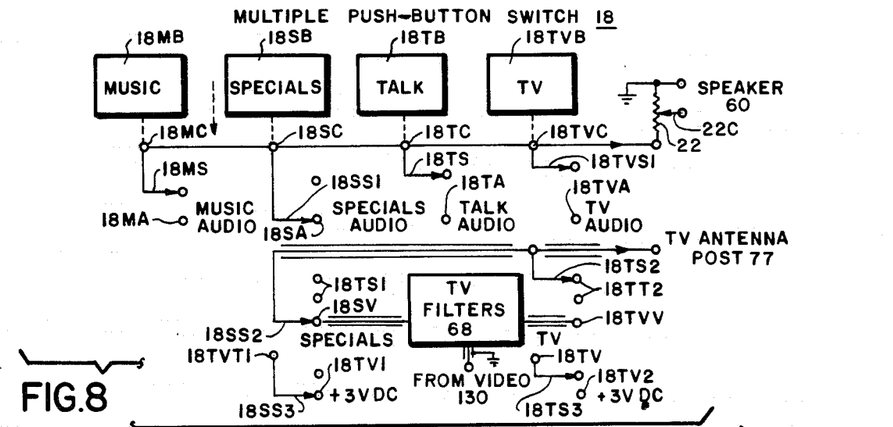
FIG. 8 is a schematic electrical diagram of the restaurant telephone console push-button switch and associated components.

FIG. 8 is a schematic diagram of the wiring of multiple push-button switch 18 (FIGS. 1 and 2) of console 10. As shown in FIG. 8, push-button switch 18 has four positions: Music, Specials, Talk and TV. Pushing one of the four buttons down to its "on" position automatically causes a downed button to return up to its "off" position.

Referring to FIGS. 7 and 8, the wires of cable 42 not connected directly to other components mounted on console 10, are connected via lugs 56 of socket 46 via snap-connect connectors (not shown) to contacts on push-button switch 18 as follows: The music audio amplifier 122 output wire is connected to contact 18MA (beneath Music push-button 18MB). The specials audio amplifier 124 output wire is connected to contact 18SA. The microphone audio amplifier 126 output wire is connected to contact 18TA. The TV audio amplifier 128 output wire is connected to contact 18TVA. The +3VDC wire is connected to contacts 18TV1 and 18TV2, which are connected via plug 129 (FIG. 3) directly to the pocket TV 80 external power source jack.

Video transmitters 130 (FIG. 7) comprise an exciter/video modulator driving a low power linear amplifier for each of two UHF channels, which are selected from among those not used in the local area. The power of each linear amplifier depends on the number of console 10s being driven, the strength of the signal at each console 10 being sufficient so that pocket TV 80 will readily tune to and stop at each of the two UHF channels fed to it. The input of one UHF channel is the video and synchronization signals from the master TV events receiver. The input of the other UHF channel is the video and synchronization signals of a video camcorder, a combined video camera and video cassette recorder used to video record and replay a chart on which the specials of the day are written. The single output of video transmitters 130 contains the video modulated carriers of the two UHF channels. That output is fed via cable 50, RG-58 coaxial cable, to each console 10. At console 10 the outer shield of the cable 50 is grounded to the chassis 14 as is all of the other coaxial cable connections in console 10.

Coaxial cable 50 connects the output of video transmitters 130 to the video input of TV filters 68 (FIG. 8)

via coaxial connectors 52 and 54 (FIG. 3) and via BNC connectors and connecting coax cable (not shown). TV filters 68 is a dual bandpass filter TV turner, one bandpass filter tuned to the specials video channel transmitted by video transmitters 130 (FIG. 7) over cable 50 and the other bandpass filter tuned to the TV video channel transmitted by video transmitters 130. The specials output of TV filters 68 (FIG. 8) is connected to contact 18SV and the TV output of TV filters 68 is connected to contact 18TVV, both by coaxial cable. Moving contact 18SS2 activated by the Specials button 18SB and moving contact 18TS2 activated by the TV button 18TVB are connected together and inductively coupled to antenna post 77 (FIG. 3) of pocket TV 80. Antenna post 77 may be shielded to prevent additional channels from being picked up by pocket TV 80.

Alternatively, two separate cables 50, one for each UHF exciter/modulator and linear amplifier of video transmitters 130, can be fed to a console 10 in which case there is no need for TV filters 68. In that event the specials video channel cable is connected directly to contact 18SV of multiple push-button switch 18 and the TV receiver channel cable is connected directly to contact 18TVV.

Remaining contacts of multiple push-button switch 18 are connected as follows; 18MC, 18SC, 18TC and 18TVC are connected together and to one side of audio volume control 22 (also see FIG. 2), the other side of which is grounded. The moving contact 22C of audio volume control 22 is connected to one terminal of speaker 60 whose other terminal is grounded.

When the Music button 18MB is pushed down, its moving contact 18MS contacts fixed contact 18MA which connects the music audio to speaker 60 via volume control 22.

When the Specials push button 18SB is pushed down, causing Music button 18MB to return to its raised or off position, its movable contact 18SS3 contacts fixed contact 18TV1 connecting +3VDC to the pocket TV 80 to instantly turn it on.

Also when the Specials push button 18SB is pushed part of the way down, and after the pocket TV 80 is turned on, its moving switch contact 18SS2 temporarily bridges and thus shorts contacts 18TS1. The blade of moving switch contact 18SS3 is long enough to slide into contact with fixed contact 18TV1 when moving contact 18SS2 is shorting contacts 18TS1, and stays in contact with fixed contact 18TV1 after movable contact 18SS2 clears the contacts 18TS1. Similarly, when the TV push button 18TVB is pushed part of the way down, its moving switch contact 18TS2 temporarily bridges and thus shorts contacts 18TT2 after movable contact 18TS3 contacts fixed contact 18TV2 connecting +3VDC to the pocket TV 80 to turn it on. Both pairs of contacts 18TS1 and 18TTs are connected across the channel selection switch of pocket TV 80 which causes the pocket TV 80 to seek a new channel in the lower frequency direction. To go from the lower frequency channel to the upper frequency channel pocket TV 80, which is set for the UHF channels, "wraps around" the UHF band. That is, pocket TV 80 automatically tunes through the highest UHF channel to the lowest UHF channel as it seeks the next video signal.

When the Specials push button 18SB is pushed all the way down its moving contact 18SS2 contacts fixed contact 18SV to which the Specials video channel signal is connected, coupling the Specials video signal to the TV antenna post 77 (FIG. 3) of the pocket TV 80, which is automatically seeking a new channel and thus stops at the Specials video channel, which is then displayed on the pocket TV 80's TV screen 26.

Also when the Specials button 18SB is pushed down, moving contact 18SS1 contacts fixed contact 18SA and the Specials audio is connected to speaker 60.

When the Talk push button 18TB (FIG. 8) is pushed down, releasing the Specials push button 18SB and thus turning pocket TV 80 off, moving contact 18TS contacts fixed contact 18TA connecting the Talk audio to speaker 60.

When the TV push button 18TVB is pushed down, causing Talk button 18TB to return to its raised or off position, its movable contact 18TS3 contacts fixed contact 18TV2 to turn on pocket TV 80, as indicated above.

Also, as indicated above, movable contact 18TS2 temporarily bridges contacts 18TT2 causing the pocket TV 80, then turned on, to seek another channel. Movable contact 18TS2 in the full down position contacts fixed contact 18TVV coupling the TV video signal channel to the TV antenna post 77, which is then displayed by pocket TV 80.

When the TV push button 18TVB is pushed all the way down, its moving contact 18TVS1 contacts fixed contact 18TVA connecting the TV audio to the speaker 60.

Figure 6:
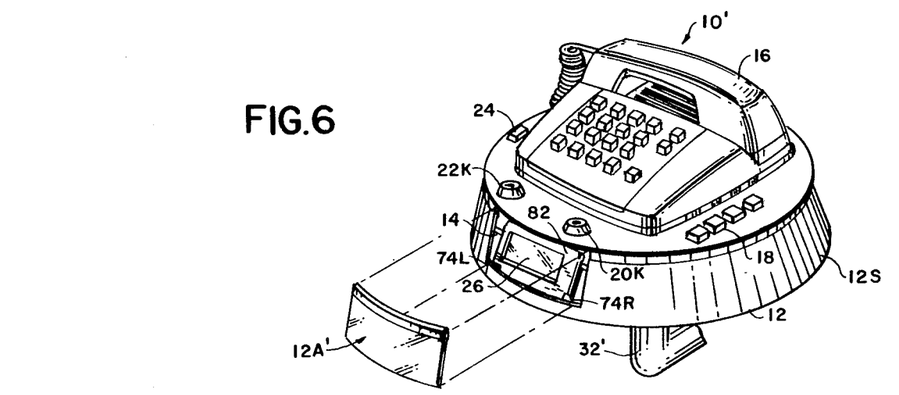
FIG. 6 (beneath FIG. 4) is a perspective view of an alternate embodiment of the telephone console invention mounted on a wall adjacent a table instead of on the table as shown in FIG. 1, with the TV display area of the circular lampshade exploded away as a magnifying lens which plugs into an opening in the side wall of the lampshade.

A wall-mounted version of console 10 is shown as console 10' in FIG. 6. It is supported on a wall via bent pipe 32' via well-known wall support means. Console 10' is the same as console 10 (FIG. 1) except that the clear TV display area 12A in side wall 12S of lampshade support 12 of console 10 is replaced by a rectangular opening into which a correspondingly-shaped magnifying lens 12A' having a peripheral groove is cement mounted. The magnifying lens 12A' magnifies the video display on TV screen 26.

Thus, in accordance with the invention, a restaurant telephone console system has been provided accomplishing all of the objects, and having the features and advantages specified at the beginning of this specification.

What is claimed is:

1. A restaurant console for a table comprising:
   (A) a U-shaped rectangular chassis adapted to be horizontally mounted on the top of a vertical pipe extending above the table;
   (B) a circular lampshade support with an upper panel and a downwardly-extending side wall, said side wall having an inside diameter substantially equal to the longest diagonal distance between two corners of said U-shaped rectangular chassis, said side wall being adapted to fit over said chassis and slidingly engage its corners;
   (C) a telephone mounted on the top of said upper panel of said circular lampshade support; and
   (D) a lamp socket connected to said U-shaped rectangular chassis and adapted to extend a lamp outside of said chassis and beneath said upper panel of said circular lampshade support, the lamp when lighted illuminating a portion of the table around said circular lampshade support.

2. A restaurant console for a table according to claim 1 further comprising a speaker mounted within said U-shaped rectangular chassis.

3. A restaurant console for a table according to claim 2 wherein said U-shaped rectangular chassis comprises a bottom panel with two upwardly-extending side walls along the long sides of the rectangle so that the short sides of the rectangl are open, said speaker is mounted cone down on the top of said bottom panel and there is no opening in said bottom panel beneath said cone.

4. A restaurant console for a table according to claim 1 further comprising a chime mounted within said U-shaped rectangular chassis.

5. A restaurant console for a table according to claim 4 wherein said U-shaped rectangular chassis comprises a bottom panel with two upwardly-extending side walls along the long sides of the rectangle so that the short sides of the rectangle are open, said chime is mounted on the top of said bottom panel and there is no opening in said bottom panel beneath said chime.

6. A restaurant console for a table according to claim 1 further comprising a pocket television set mounted within said U-shaped rectangular chassis.

7. A restaurant console for a table according to claim 6 wherein said pocket television set comprises a liquid crystal display screen mounted adjacent an edge of and at a predetermined angle with respect to said bottom panel of said chassis, and screen illumination means is positioned behind said screen.

8. A restaurant console for a table according to claim 7 wherein said liquid crystal display screen is normally illuminated from its outside surface to produce a picture on a mirror on the other side of the screen whereas said screen illumination means illumines said screen from its inside surface.

9. A restaurant console for a table according to claim 7 wherein said predetermined angle is substantially 60 degrees.

10. A restaurant console for a table according to claim 1 further comprising a speaker and chime mounted within said U-shaped rectangular chassis.

11. A restaurant console for a table according to claim 1 further comprising a speaker, chime and pocket television set mounted within said U-shaped rectangular chassis.

12. A restaurant console system for a table comprising:
(A) a U-shaped rectangular chassis adapted to be horizontally mounted on the top of a vertical pipe extending above the table;
(B) a circular lampshade support with an upper panel and a downwardly-extending side wall, said side wall having an inside diameter equal to the longest diagonal distance between two corners of said U-shaped rectangular chassis, said side wall being adapted to fit over said chassis and slidingly engage its corners;
(C) a telephone mounted on the top of said upper panel of said circular lampshade support;
(D) a lamp socket connected to said U-shaped rectangular chassis and adapted to extend a lamp beneath said upper panel of said circular lampshade support, the lamp when lighted illuminating a portion of the table around said circular lampshade support;
(E) a chime mounted within said U-shaped rectangular chassis;
(F) a voltage source for illuminating a lamp in said lamp socket; and
(G) switch means for transferring said voltage source from a lamp in said lamp socket to said chime so that when said chime is operated by said voltage source the lamp is turned off.

13. A restaurant console system for a table according to claim 12 further comprising:
(A) a telephone line connected to said telephone;
(B) a ringing current source connected to said telephone line;
(C) said switch means being responsive to ringing current from said ringing current source to operate said chime and turn off a lamp in said lamp socket.

14. A restaurant console for a table comprising:
(A) a chassis adapted to be horizontally mounted on the top of a vertical pipe extending above the table;
(B) a lampshade support with an upper panel and a downwardly-extending side wall, said lampshade support being adapted to mount over said chassis;
(C) a telephone mounted on the top of said upper panel of said lampshade support; and
(D) a lamp socket connected to said chassis and adapted to hold a lamp outside of said chassis and beneath said upper panel of said lampshade support, the lamp when lighted illuminating a portion of the table around said lampshade support.

15. A restaurant console for a table according to claim 14 further comprising a speaker mounted on said chassis.

16. A restaurant console for a table according to claim 14 further comprising a speaker mounted cone down on said chassis and there is no opening in the chassis beneath said cone.

17. A restaurant console for a table according to claim 15 wherein said chassis comprises a bottom panel with two upwardly-extending side walls and said speaker is mounted cone down on the top of said bottom panel and there is no opening in said bottom panel beneath said cone.

18. A restaurant console for a table according to claim 14 further comprising a chime mounted on said chassis.

19. A restaurant console for a table according to claim 14 further comprising a pocket television set mounted on said chassis.

20. A restaurant console for a table according to claim 19 wherein said picket television set comprises a liquid crystal display screen mounted adjacent an edge of and at a predetermined angle with respect to said chassis, and screen illumination means is positioned on said chassis behind said screen.

21. A restaurant console for a table according to claim 20 wherein said predetermined angle is substantially 60 degrees.

22. A restaurant console for a table according to claim 20 wherein said liquid crystal display screen is normally illuminated from its outside surface to produce a picture on a mirror on the other side of the screen whereas said screen illumination means illumines said screen from its inside surface.

23. A restaurant console for a table according to claim 21 wherein said predetermined angle is substantially 60 degrees.

24. A restaurant console for a table according to claim 14 further comprising a speaker and a chime mounted on said chassis.

25. A restaurant console for a table according to claim 14 further comprising:
(A) a chime mounted on said chassis;
(B) a voltage source for illuminating a lamp in said lamp socket; and
(C) switch means for transferring said voltage source from a lamp in said lamp socket to said chime so that when said chime is operated by said voltage source the lamp is turned off.

26. A restaurant console for a table according to claim 25 further comprising:
(A) a telephone line connected to said telephone;
(B) a ringing current source connected to said telephone line;
(C) said switch means being responsive to ringing current from said ringing current source to operate said chime and turn off a lamp in said lamp socket.

27. A restaurant console for a table according to claim 19 wherein said lampshade support is translucent and its upper panel is colored, and said screen illumination means also illuminates said upper panel.

28. A restaurant console for a table according to claim 7 wherein said circular lampshade support is translucent and its upper panel is colored, and said screen illumination means also illuminates said upper panel.

29. A restaurant console for a table according to claim 1 wherein said U-shaped rectangular chassis rotates around said vertical pipe.

30. A restaurant console for a table according to claim 14 wherein said chassis rotates around said support member.

31. A restaurant console for a table according to claim 1 further comprising alarm means to signal when said circular lampshade support is removed from said U-shaped rectangular chassis.

32. A restaurant console for a table according to claim 14 further comprising alarm means to signal when said lampshade support is removed from said chassis.

33. A restaurant console for a table according to claim 31 wherein said alarm means comprises a lever-actuated switch attached to said U-shaped rectangular chassis and said circular lampshade support includes a post member which engages said switch when said circular lampshade support is positioned over said chassis, wherein when said circular lampshade support is lifted from said chassis an alarm indicator is activated by said switch.

34. A restaurant console for a table according to claim 32 wherein said alarm means comprises a lever-actuated switch attached to said chassis and said lampshade support includes a post member which engages said switch when said lampshade support is positioned over said chassis, wherein when said lampshade support is lifted from said chassis an alarm indicator is activated by said switch.

35. A restaurant console for a table according to claim 11 further comprising an audio source to feed audio signals to said speaker and a video source to feed video signals to said pocket television set.

36. A restaurant console for a table according to claim 15 further comprising an audio source to feed audio signals to said speaker.

37. A restaurant console for a table according to claim 19 further comprising a video source to feed video signals to said pocket television set.

38. A restaurant console for a table according to claim 19 further comprising a video source to feed video signals for two television channels to said pocket television set.

39. A restaurant console for a table according to claim 1 wherein said side wall of said circular lampshade support comprises a vertical portion which is in slidable engagement with said chassis and a portion extending angularly outwardly from said vertical portion.

40. A restaurant console for a table according to claim 14 wherein said side wall of said lampshade support comprises a vertical portion which is in slidable engagement with said chassis and a portion extending angularly outwardly from said vertical portion.

41. A restaurant console system comprising:
(A) a chassis adapted to be mounted on a support member extending above a table in the restaurant;
(B) a lampshade support adapted to fit over said chassis;
(C) a telephone mounted on the top of said lampshade support;
(D) a lamp socket connected to said chassis and adapted to hold a lamp outside said chassis and beneath said lampshade support, the lamp when lighted illuminating a portion of the table around said lampshade support;
(E) a television set mounted on said chassis;
(F) a video source to feed video signals for two television channels to said chassis;
(G) television channel separation means mounted on said chassis and responsive to separate said video signals; and
(H) switch means for feeding one of said separated television channels to said television set.

42. A restaurant console system according to claim 41 wherein said television set comprises a signal seeking system whereby when said switch means changes the television channel signal fed to said television set, said television set automatically tunes into the changed channel.

43. A restaurant console system according to claim 41 wherein said lampshade support comprises a magnifying lens positioned in front of the display screen of said television set.

44. A restaurant console system according to claim 6 wherein said circular lampshade support comprises a magnifying lens positioned in front of the display screen of said television set.

45. A restaurant console system according to claim 41 wherein said support member is a vertical pipe attached to and extending from the table.

46. A restaurant console system according to claim 41 wherein said support member is an L-shaped pipe having a horizontal portion adapted to connect to a wall adjacent the table and a vertical portion connected to said chassis.

47. A restaurant console system according to claim 14 wherein said support member is an L-shaped pipe having a horizontal portion adapted to connect to a wall adjacent the table and a vertical portion connected to said chassis.

48. A restaurant console system according to claim 1 wherein said vertical pipe is an L-shaped pipe having a horizontal portion adapted to connect to a wall adjacent the table and a vertical portion connected to said chassis.

49. A restaurant console system according to claim 41 wherein said support member is a vertical pipe attached to and extending from the table.

50. A restaurant console system according to claim 41 wherein said support member is a vertical pipe attached to and extending from the table and further comprising cable means passing through said vertical pipe to said chassis.

51. A restaurant console system according to claim 41 wherein said support member comprises a vertical pipe portion and further comprising cable means passing through said vertical pipe portion to said chassis.

52. A restaurant console system according to claim 51 wherein said cable means comprises a coaxial cable to conduct video signals and a multi-wire cable to conduct audio and control signals.

53. A restaurant console system according to claim 13 further comprising a telephone ringing current indicator responsive to telephone ringing current to display a blinking light during the presence of said telephone ringing current.

54. A restaurant console system according to claim 26 further comprising a ringing current indicator responsive to telephone ringing current from said ringing current source to display a blinking light during the presence of said ringing current.

* * * * *